March 19, 1968  H. DÜRR  3,374,458
FLASH UNIT
Filed Nov. 23, 1966
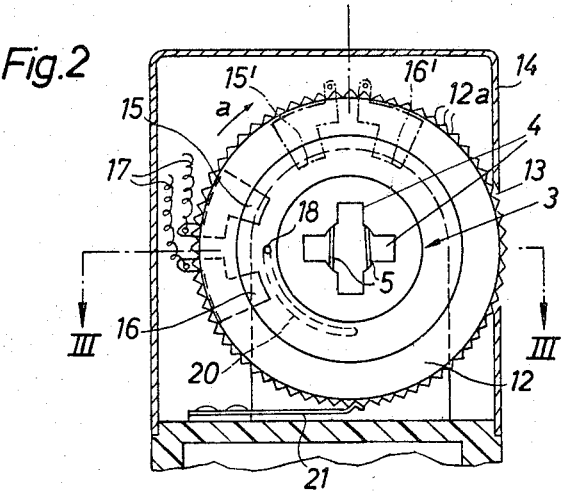
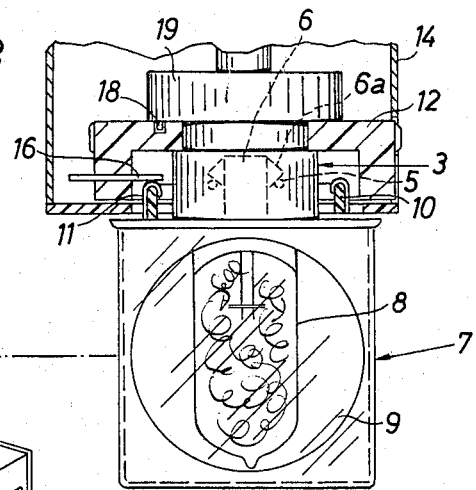
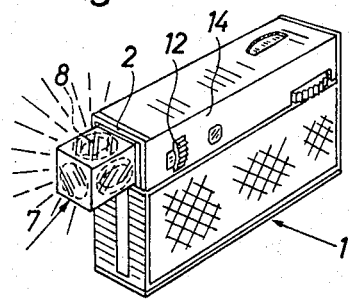
INVENTOR.
HELMUT DÜRR
BY United States Patent Office 3,374,458
Patented Mar. 19, 1968

3,374,458
FLASH UNIT
Helmut Dürr, Munich, Germany, assignor to Agfa-Gevaert Aktiengesellschaft, Leverkusen, Germany
Filed Nov. 23, 1966, Ser. No. 596,553
Claims priority, application Germany, Dec. 2, 1965,
A 24,810
18 Claims. (Cl. 339—147)

The present invention relates to flash units in general, and more particularly to improvements in flash units which utilize "Flashcubes" or other types of multiple flash bulb holders and are equipped with indexing means for placing successive flash bulbs into an optimum position for firing.

It is an important object of the present invention to construct a flash unit in such a way that the user can bring about indirect illumination of the subject without necessitating any changes in the position of the flash bulb holder.

Another object of the invention is to provide a flash unit wherein the flash circuit can be interrupted when a fresh flash bulb is in a position in which it is normally ready to be fired in response to closing of the synchronizing switch.

A further object of the invention is to provide a flash unit which can be constructed as a self-contained entity or can be built into a photographic camera and wherein the selection of that flash bulb which is to be fired next can be made with little loss in time, by means which can be readily manipulated in a dark room, and with requisite accuracy so that the operator of the camera knows exactly what type of artificial illumination to expect in the course of the next exposure with flash.

An additional object of the invention is to provide a flash unit which can be readily converted from indirect illumination to direct illumination of a subject or vice versa.

A concomitant object of the invention is to provide a flash unit which is constructed in such a way that no leak current can flow in its circuit.

Still another object of the invention is to provide a flash unit of the above outlined characteristics which is of very simple construction and consists of inexpensive parts so that it can be readily incorporated in medium priced and also in popularly priced cameras, which occupies little room, and which enables an operator to achieve a large number of different illuminating effects by utilizing commercially available multiple flash bulb holders.

Briefly stated, one feature of my invention resides in the provision of a flash unit which can constitute a self-supporting or self-contained body or is built into a photographic camera and can be used with multiple flash bulb holders of the type having a plurality of electric contact means and flash bulbs each electrically connected with one such contact means. The flash unit comprises a support which can be constituted by the housing of a camera, a socket or an analogous coupling member movably mounted in the support and having means for engaging and holding a multiple flash bulb holder so that the holder shares movements of the coupling member, and electric terminal means mounted on and movable with reference to the support into or from current conducting engagement with selected contact means of a holder which is held by the coupling member.

If the holder is a "Flashcube" wherein the flash bulbs and the contact means are distributed about the axis of rotation of the holder, the coupling member is indexible about a predetermined axis and the terminal means is preferably mounted on a carrier of insulating material which is coaxial with and can be rotated with reference to the coupling member. By changing the angular position of the carrier, the user of the flash unit can connect into the flash circuit a selected flash bulb, i.e., not necessarily that flash bulb which, when fired, would effect direct illumination of the subject. The selected flash bulb can illuminate the ceiling or a selected side wall of the room where the picture with flash is being taken whereby the ceiling or the side wall reflects some light onto the subject.

Save for the provision of movable terminal means, the remainder of the flash circuit in the flash unit forms no part of the present invention. Such flash unit may comprise a customary capacitor, a synchronizing switch and a battery or another suitable source of electrical energy.

The novel features which are considered as characteristic of the invention are set forth in particular in the appended claims. The improved flash unit itself, however, both as to its construction and its mode of operation, together with additional features and advantages thereof, will be best understood upon perusal of the following detailed description of a specific embodiment with reference to the accompanying drawings, in which:

FIG. 1 is a perspective view of a still camera having a built-in flash unit which embodies my invention;

FIG. 2 is an enlarged transverse vertical section through the housing of the camera, with the multiple flash bulb holder removed from its socket; and FIG. 3 is an axial section through the flash unit substantially as seen in the direction of arrows from the line III—III of FIG. 2.

Referring first to FIG. 1, there is shown a still camera having a housing 1 and provided with a built-in flash unit utilizing so-called "Flashcubes" 7, i.e., multiple flash bulb holders of the type having four identical flash bulbs 8 disposed behind transparent walls and in front of suitable reflectors 9. In the illustrated embodiment, the housing 1 of the still camera is arranged to carry the multiple flash bulb holder 7 in such a way that the latter is indexible about a horizontal axis when the camera is held in normal position.

The housing 1 comprises an upper portion 14 which constitutes a support for a rotary coupling member or socket 3 shown in FIGS. 1 and 2. This socket is adjacent to an opening 2 in the side panel of the upper wall portion 14 and is provided with a centrally located recess 4 which is preferably of cruciform cross-sectional outline to receive a customary plug 6 of the multiple flash bulb holder 7. The plug 6 has radially extending projections or teeth 6a which are receivable and slidable in the four radially extending sections of the recess 4 and can be engaged and held by conventional springs 5 which are mounted in the interior of the socket 3 to prevent accidental detachment of the holder 7. The socket 3 is indexible through 90 degrees or a multiple of 90 degrees, either by a suitable hand wheel, in response to manipulation of the film transporting mechanism, or in response to actuation of the shutter release trigger. Such indexing means form no part of my invention and, therefore, are not shown in the drawings.

The flash bulb holder 7 further comprises an annular skirt or base 10 which is concentric with and surrounds the plug 6. This base carries four pairs of electric contacts 11, one pair for each flash bulb 8. The manner in which each such flash bulb is connected in circuit with a pair of contacts is well known and can be determined by looking at a commercially available "Flashcube."

In accordance with the present invention, the terminals 15, 16 which are utilized to connect successive or selected flash bulbs 8 into the circuit of the flash unit are mounted on a ring- or wheel-shaped carrier 12 of insulating material which is rotatably mounted in the wall portion 14 and is coaxial with the socket 3. The carrier 12 is rotatable independently of the socket and is not connected with the indexing mechanism. The peripheral surface of the carrier 12 is knurled or milled, as at 12a, and a portion thereof extends through a window 13 provided in the rear panel of the wall portion 14 so that it may be engaged and turned by a finger when the operator wishes to change the angular position of the terminals 15, 16. These terminals are connected with the remainder of the flash circuit by flexible conductors 17 shown in FIG. 2. The terminals 15, 16 are preferably elastic and are disposed at such a distance from each other that they can engage one pair of contacts 11 in each of the two end positions of the carrier 12. Such end positions are determined by stop means including a pin 18 fixedly secured to a support 19 which can constitute an integral part of the wall portion 14, and an arcuate slot 20 machined into the adjoining end face of the carrier 12 and receiving the pin 18. In the illustrated embodiment, the pin 18 will arrest the carrier 12 (and hence the terminals 15, 16) in response to clockwise or counterclockwise rotation through 90 degrees. This suffices to place the terminals 15, 16 into current conducting engagement with the contacts 11 of two successive flash bulbs 8. The pairs of contacts 11 are distributed at equal intervals about the axis of the plug 6. With reference to FIG. 2, the terminals 15, 16 can be moved between the solid-line positions and phantom-line positions 15', 16'. When in their solid-line positions, the terminals 15, 16 connect in the flash circuit that flash bulb 8 which faces the subject, namely, the flash bulb (not shown) which emits the light rays indicated in FIG. 1. If the carrier 12 is thereupon rotated through 90 degrees (arrow a in FIG. 2), the terminals 15, 16 (in the positions 15', 16') will engage the contacts 11 of the flash bulb which is indicated in FIG. 1 by the numeral 8, i.e., that flash bulb which, when fired, will direct light toward the ceiling. In this way, the user of the camera can effect an indirect illumination of the subject. It is considered preferable to index the socket 3 in a counterclockwise direction, as viewed in FIG. 2, so that the terminals 15, 16 automatically connect in the flash circuit that flash bulb which can effect direct illumination of the subject provided, of course, that the carrier 12 is held in the end position of FIG. 2. In order to make an exposure without flash, but without detaching the multiple flash bulb holder 7, the operator will simply place the carrier 12 into an intermediate position in which the terminals 15, 16 are held between two adjoining pairs of contacts 11. The feature that the terminals 15, 16 are movable into one or more intermediate positions is of particular importance in flash units whose flash circuit includes a capacitor because the terminals can eliminate leak currents. Of course, it is also possible to provide the carrier 12 with a slot 20 of such length that the terminals 15, 16 can be turned through angles which exceed 90 degrees, for example, through 45 degrees beyond each of the two end positions shown in FIG. 2. A detent spring 21 is mounted in the wall portion 14 and cooperates with the milled peripheral portion 12a of the carrier 12 to yieldably hold the latter in a selected angular position. Other detent means (for example, a spring-biased ball which can enter angularly spaced notches in the periphery of the carrier 12) can be used as a substitute for the spring 21, and the carrier may be provided with suitable marker means to indicate its angular position to the user.

The carrier 12 is referably rotatable through 180 degrees, i.e., through 90 degrees to both sides of its normal position, when the socket 3 is indexible about a vertical axis as is customary in many types of still cameras. By turning the carrier 90 degrees to the one or the other side of its central or normal position, the user can fire one of two flash bulbs which illuminate the one or the other side wall of the room wherein the exposure with flash is being made. In this way, the subject may be illuminated indirectly, either from the left or from the right, depending on the desired effect.

If the carrier 12 of FIGS. 2 and 3 is provided with a longer slot 20 so that it can move the terminals 15, 16 between the end positions 15', 16' and second end positions diametrically opposite such end positions, the user can direct artificial light against the one or the other side wall by turning the entire camera housing through 90 degrees so that the multiple flash bulb holder 7 extends upwardly.

Of course, the improved flash unit is susceptible of many additional modifications without departing from the spirit of my invention. For example, the socket 3 and the carrier 12 can be mounted in the casing of a self-contained flash unit which can be coupled to the housing of a camera by means of a conventional accessory shoe and foot. The casing of the self-contained flash unit then constitutes the support for the parts 3, 12 and 15, 16. The socket 3 could be used with multiple flash bulb holders having more than four flash bulbs or less than four flash bulbs.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. A flash unit for use with multiple flash bulb holders of the type having a plurality of electric contact means and a flash bulb electrically connected with each such contact means, comprising a support; a coupling member movably mounted in said support and having means for engaging and holding a multiple flash bulb holder so that the holder shares movements of said coupling member; and electric terminal means mounted on and movable with reference to said support into and from current-conducting engagement with selected contact means of a holder which is held by said coupling member.

2. A flash unit as defined in claim 1 for use with rotary multiple flash bulb holders whose contact means are distributed about the holder axis, wherein said coupling member is rotatable in said support about a predetermined axis and said terminal means is also rotatable about said predetermined axis.

3. A flash unit as defined in claim 2, wherein each of said contact means comprises a pair of contacts.

4. A flash unit as defined in claim 2, further comprising a carrier coaxial with said coupling member and rotatably mounted in said support, said terminal means being mounted on said carrier.

5. A flash unit as defined in claim 4, wherein said coupling member is a socket having a concentric recess arranged to accommodate a portion of a multiple flash bulb holder and said carrier is a ring which surrounds said socket.

6. A flash unit as defined in claim 4, wherein said support comprises a wall having a window therein and said carrier is a ring having a portion extending outwardly through said window.

7. A flash unit as defined in claim 6, wherein said ring has a milled peripheral surface which is engageable by fingers to facilitate rotation of the ring about said predetermined axis.

8. A flash unit as defined in claim 4, further comprising stop means for arresting said carrier in a plurality of angular positions in each of which said terminal means engages with one contact means of a holder which is held by said coupling member.

9. A flash unit as defined in claim 8, wherein said arresting means comprises pin and slot means respectively provided on said carrier and said support.

10. A flash unit as defined in claim 4, further comprising resilient detent means for yieldably holding said carrier in selected angular positions.

11. A flash unit as defined in claim 1, wherein said support is constituted by the housing of a photographic camera and further comprising carrier means engageable by hand to move said terminal means with reference to said housing.

12. A flash unit as defined in claim 4 for use with multiple flash bulb holders whose contact means are constituted by pairs of equidistant contacts disposed at identical distances about the holder axis, wherein said terminal means comprises a pair of terminals disposed at the same distance from each other as the pairs of contacts on the holder, and further comprising flexible conductor means connected with said terminals.

13. A flash unit as defined in claim 4, wherein said carrier is rotatable in clockwise and counterclockwise directions.

14. A flash unit as defined in claim 13, wherein said carrier is rotatable between two end positions whose angular distance equals the angular distance between the contact means of a holder which is held by said coupling member.

15. A flash unit as defined in claim 4, wherein said predetermined axis is a substantially vertical axis.

16. A flash unit as defined in claim 4, wherein said predetermined axis is a substantially horizontal axis.

17. A flash unit as defined in claim 1, wherein said terminal means is movable to at least one intermediate position out of current conducting engagement with the contact means of one flash bulb of a holder which is held by said coupling member.

18. A flash unit as defined in claim 1, wherein said terminal means is rotatable about a fixed axis between two end positions and at least one intermediate position wherein said terminal means is out of current conducting engagement with the pair of contacts of one flash bulb of a holder which is held by said coupling member.

References Cited
UNITED STATES PATENTS

| | | | |
|---|---|---|---|
| 2,622,188 | 12/1952 | Seeger et al. | 240—1.3 |
| 3,094,284 | 6/1963 | Hehl | 240—1.3 |
| 3,273,480 | 9/1966 | Winkler et al. | 240—1.3 X |
| 3,286,611 | 11/1966 | Lange | 240—1.3 X |
| 3,319,548 | 5/1967 | Kottler. | |

RICHARD E. MOORE, *Primary Examiner.*